United States Patent [19]
Hammond et al.

[11] Patent Number: 5,940,872
[45] Date of Patent: Aug. 17, 1999

[54] SOFTWARE AND HARDWARE-MANAGED TRANSLATION LOOKASIDE BUFFER

[75] Inventors: Gary N. Hammond, Campbell; Koichi Yamada, San Jose; Stephen G. Burger, Santa Clara; James O. Hays, San Jose; Jonathan K. Ross, Sunnyvale; William R. Bryg, Saratoga, all of Calif.

[73] Assignee: Intel Corporation, Santa Clara, Calif.

[21] Appl. No.: 08/742,467

[22] Filed: Nov. 1, 1996

[51] Int. Cl.⁶ .................................................. G11C 12/10
[52] U.S. Cl. ............................................ 711/207; 711/206
[58] Field of Search ...................................... 711/206, 207

[56] References Cited

U.S. PATENT DOCUMENTS

4,774,653   9/1988   James ................................... 711/207

*Primary Examiner*—Jack A. Lane
*Attorney, Agent, or Firm*—Arnold, White & Durkee

[57] ABSTRACT

A translation lookaside buffer (TLB) is provided including a first storage location in the TLB for storing at least a portion of a first virtual to physical memory translation. The first storage location in the TLB is both hardware-managed and software-managed. The TLB also includes a second storage location in the TLB for storing at least a portion of a second virtual to physical memory translation. The second storage location in the TLB is only software-managed.

20 Claims, 4 Drawing Sheets

— Fixed boundary between the translation register and the translation cache

FIG. 6  Lock bits

SOFTWARE AND HARDWARE-MANAGED TRANSLATION LOOKASIDE BUFFER

1. BACKGROUND OF THE INVENTION

The present invention relates to a translation lookaside buffer (TLB) that may be used in a microprocessor to speed up the translation of virtual memory addresses into physical memory addresses. More specifically, the present invention relates to a TLB that contains storage locations that are both hardware-managed and software-managed.

Memory in a computer is a linear array of bytes. Each byte has a unique address known as its physical address. However, many microprocessors do not typically address memory by the memory's physical address. Instead, memory is addressed using virtual memory addresses. A virtual memory address, which is commonly known as a virtual address, is an address of a location in virtual memory.

1.1 Virtual memory

Virtual memory addressing is a technique used to provide the illusion of having a memory space that is much larger than the physical memory available in a computer system. This illusion allows a computer program to be written without regard to the exact size of physical memory. One benefit of virtual memory addressing is that a computer program can easily run on a computer with a wide range of memory configurations and with radically different physical memory sizes. Another benefit is that a computer program may be written that uses a virtual memory size that is much larger than the physical memory available on a particular computer system.

Virtual memory may be thought of as a collection of blocks. These blocks are often of fixed size and aligned, in which case they are known as pages. A virtual address may often be broken down into two parts, a virtual page number and an offset. The virtual page number specifies the virtual page to be accessed. The offset indicates the number of memory bytes from the first memory byte in the virtual page to the addressed memory byte. Physical addresses, which represent where data actually resides in physical memory, may also be broken down into two parts, a physical page number and an offset. The physical page number specifies the physical page to be accessed. The offset indicates the number of memory bytes from the first memory byte in the physical page to the addressed memory byte.

A virtual address must be mapped into a physical address before physical memory may be accessed. The mapping is often maintained through a table, known as a page table. The page table contains virtual to physical memory translations. A virtual to physical memory translation consists of a virtual page number and a corresponding physical page number. Because virtual addresses are typically mapped to physical addresses at the level of pages, the page table may be indexed by virtual page numbers. In addition to virtual to physical memory translations, the page table may often contain other information such as the disk locations where pages are stored when not present in main memory and an indication of whether pages are present in memory or residing on a disk. Typically, the operating system inserts and deletes the virtual to physical memory translations that are stored in the page table. In other words, the page table is managed by the operating system.

1.2 Translation lookaside buffers

Virtual memory requires two memory accesses to fetch a single entry from memory. The first access is into the page table. This access is used to map the virtual address into the physical address. After the physical address is known, then a second access is required to fetch the data. In an effort to speed up memory accesses, conventional microprocessors use a special-purpose cache memory to store certain virtual to physical memory translations. This special-purpose cache memory is often called a translation lookaside buffer (TLB). The number of virtual to physical memory translations in a TLB is typically smaller than the total number of translations in the page table.

Conventional TLBs are often associative. An associative memory is a memory in which the storage locations are identified by a part of or by all of their contents. An associative memory may be contrasted with non-associative memories which identify storage locations by their addresses. A storage location may be a general-purpose microprocessor register or a special-purpose microprocessor register. In addition, a storage location may be a series of memory cells in a cache memory that is internal to or external to a microprocessor. Associative memories are also known as content-addressable memories or CAMs. An associative memory enables faster interrogation and retrieval of a particular data element. Thus, a TLB often returns a requested virtual to physical memory translation in a sufficiently short time so that the two memory accesses required to fetch a single entry from memory occur in a single microprocessor clock cycle.

When a microprocessor addresses memory through a TLB, the virtual page number that is included in the virtual address is used to interrogate the TLB. If the virtual page number is stored in the TLB, then the TLB outputs the physical page number that maps to the virtual page number. Sometimes the TLB does not contain the virtual page number. This is known as a TLB miss. When a TLB miss occurs, the microprocessor often requests the operating system to supply the physical page number from the page table. After the operating system supplies the physical page number, the physical memory is addressed. The delay that occurs when the operating system supplies the physical page number is significant. In fact, it is often possible for a microprocessor to execute many instructions in the time that it takes for the operating system to supply a single physical page number. Thus, microprocessor designers attempt to minimize the frequency of TLB misses.

1.2.1 Hardware-managed translation lookaside buffers

One method used by designers to minimize TLB misses involves the use of a hardware-managed TLB. A hardware-managed TLB contains hardware-managed storage locations. When a TLB miss occurs, the microprocessor references the page table to obtain the missing virtual to physical memory translation. Next, this virtual to physical memory translation is inserted into the hardware-managed storage location.

Thus, a hardware-managed storage location stores virtual to physical memory translations that are inserted into that storage location directly by a microprocessor. In other words, the virtual to physical memory translation is inserted into the storage location by the microprocessor without a "special computer program instruction" that instructs the microprocessor to insert the translation into the particular storage location. An example of a hardware-managed TLB is found in Intel's Pentium™ Processor.

A hardware-managed TLB may automatically fill the TLB with a requested physical page number when a TLB miss occurs. This hardware assist may occur concurrently with other microprocessor functions. Further, a hardware-managed TLB may ensure that the most recently used physical pages are stored in the TLB.

The primary disadvantage of hardware-managed TLBs is that the storage of the most recently used page numbers may not be optimal for certain computer programs. Thus, certain computer programs may require significantly more execution time than would be required if the TLB was more optimally managed.

1.2.2 Software-managed translation lookaside buffers

Another method used by designers to minimize TLB misses is the use of a software-managed TLB. A software-managed TLB contains software-managed storage locations. A software-managed storage location stores a virtual to physical memory translation that is inserted into the storage location by a computer program running on a microprocessor. Typically, one or more "special computer program instructions" are used to store a virtual to physical memory translation in a software-managed storage location. Such "special computer program instructions" specify the virtual to physical memory translation that is to be stored. Further, such "special computer program instructions" may optionally specify the particular storage location in which the virtual to physical memory translation is to be stored. Microprocessors will not invalidate or replace a virtual to physical memory translation that is stored in a software-managed storage location.

Thus, a software-managed TLB may be controlled by a computer program running on a microprocessor such as a computer operating system. A computer program may store certain virtual to physical memory translations in the TLB regardless of physical page use patterns. For example, virtual to physical memory translations for operating system kernels, framebuffers, or input-output areas may be stored in the TLB regardless of their use patterns. A virtual to physical memory translation that remains stored in the TLB regardless of the physical page use pattern is known as "locked down" or "pinned" in the TLB. An example of a software-managed TLB is found in the MIPS processor.

A disadvantage of software-managed TLBs is that they may not be automatically filled by microprocessor hardware concurrent with other microprocessor activity. Another disadvantage of software-managed TLBs is that they are less flexible than hardware-managed TLBs. For example, computer programs may not take advantage of additional TLB resources that are included in certain high-performance microprocessors. Similarly, microprocessor manufacturers may be required to build software-managed TLBs that are backwardly compatible with previous non-optimal software-managed TLBs.

1.2.3 Hardware-managed translation lookaside buffers combined with software-managed translation lookaside buffers Some recent microprocessor designers have included a hardware-managed TLB and a software-managed TLB in a single microprocessor. For example, the PA_RISC and the Motorola 88K include both hardware-managed TLBs and software-managed TLBs. While such TLBs provide many of the benefits of the hardware-managed TLBs and software-managed TLBs discussed above, they are not optimal.

First, microprocessor designers must allocate silicon area on the microprocessor for each TLB structure. If either TLB structure is under-utilized, then that silicon area does not contribute to the overall TLB performance. For example, if only a portion of the software-managed TLB is utilized, then the remaining storage locations in the software-managed TLB are unused. Thus, silicon area is wasted.

Second, when a virtual to physical translation is needed, each TLB structure must be looked up in parallel and then the correct translation selected from the correct structure. The selection of a virtual to physical memory translation from the correct TLB and muxing the array outputs typically represent a critical timing path. Thus, a TLB may not return a requested virtual to physical memory translation in a sufficiently short time so that the two memory accesses required to fetch a single entry from memory may occur in a single microprocessor clock cycle.

There is a need for a TLB that optimizes silicon area, does not induce delays in critical paths, and that has the benefits but not the disadvantages of both software-managed TLBs and hardware-managed TLBs.

2. SUMMARY OF THE INVENTION

A translation lookaside buffer (TLB) is described. The TLB includes a storage location for storing at least a portion of a virtual to physical memory translation. This storage location is both hardware-managed and software-managed.

4. DETAILED DESCRIPTION OF SPECIFIC EMBODIMENTS

Before discussing the TLB of the present invention, a particular virtual addressing scheme will be discussed.

4.1 Virtual addressing 4.1.1 Virtual address space

A virtual address space is the range of virtual addresses that comprise valid virtual addresses for a computer program running on a particular operating system. For example, a particular operating system may have a 64-bit virtual address space. Thus, virtual addresses ranging from 0 to $2^{64}$ −1 would be valid virtual addresses.

4.1.2 Virtual address region

Figure 1:
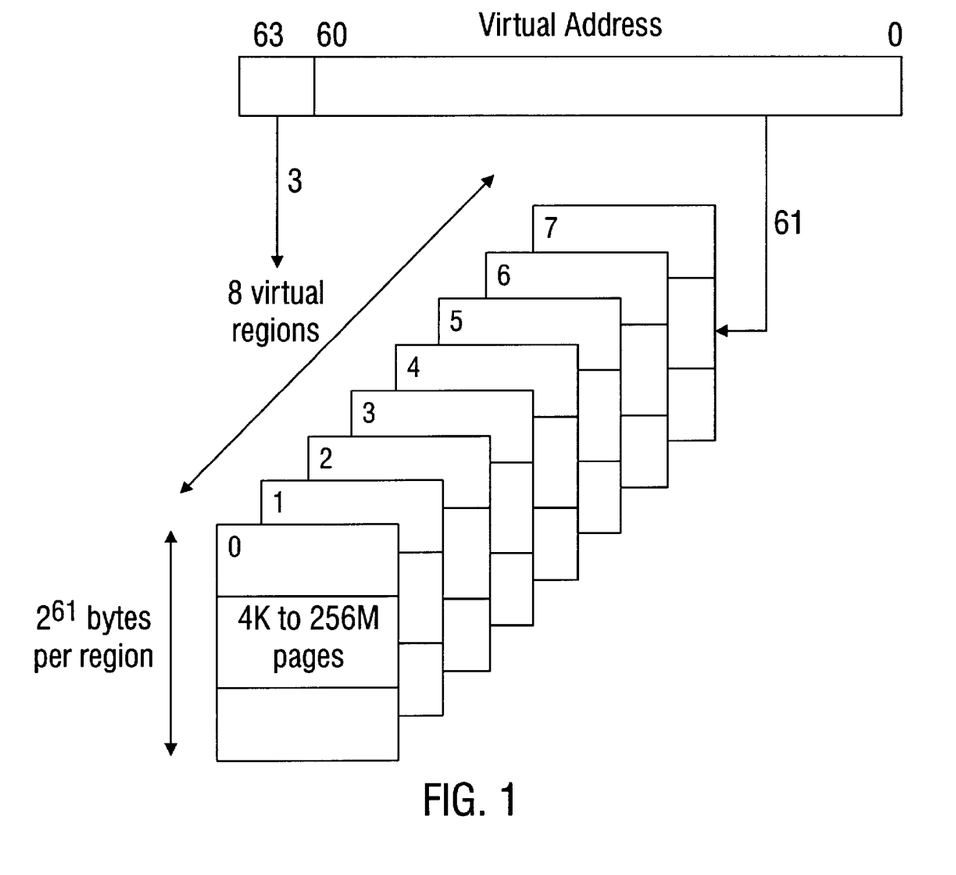
FIG. 1 presents eight $2^{61}$ byte virtual address regions of a $2^{64}$ byte virtual address space.

As shown in FIG. 1, an operating system may divide the virtual address space into virtual regions. A virtual region is a subdivision of the virtual address space. Virtual regions are often allocated to system tasks and/or computer programs. For example, the above discussed 64-bit virtual address space may be divided into eight $2^{61}$ byte virtual regions. Each of these virtual regions has a starting address. A starting address of a virtual region is the virtual address for the first byte of memory in that virtual region. In one embodiment, the starting addresses of the virtual regions may be 24-bit virtual addresses. These starting addresses may be stored in virtual region registers. Thus, if there are eight virtual regions, then there may be eight virtual region registers.

By placing a starting address of a virtual region immediately following the last byte of the previous virtual region, virtual regions may be combined to produce larger virtual work-spaces. For example, an operating system could implement a 62-bit work-space for data, a 62-bit work-space for I/O and even a 63-bit work-space for additional data.

4.2 Virtual address 4.2.1 Virtual region number

Figure 2:
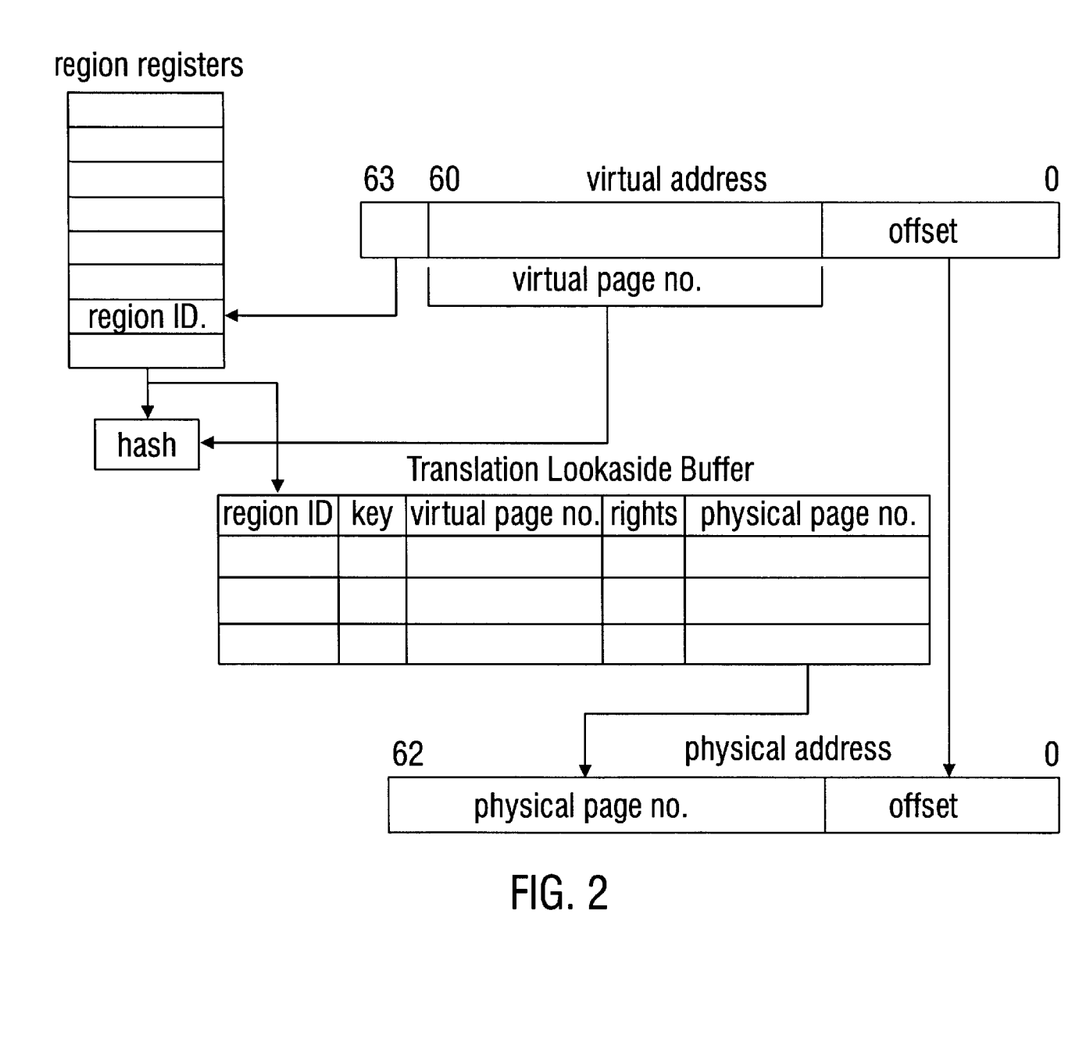
FIG. 2 presents a virtual address translation for one embodiment of the invention.

As shown in FIG. 2, the upper three bits of a virtual address may be used to select a virtual region. These three bits will be referred to as a virtual region number. While the embodiment shown in FIG. 2 shows a three-bit virtual region number, the number of bits in the virtual region number may vary depending on the particular virtual translation scheme utilized.

4.2.2 Virtual page number

Referring again to FIG. 2, a virtual address's virtual region number may be combined with additional bits in the virtual address to form a virtual page number. This virtual page number may be translated into a physical page number when physical memory is referenced.

4.2.3 Virtual offset

The bits in the virtual address that are not included in the virtual page number will be referred to as virtual offset bits. As discussed above, the virtual offset indicates the number of memory bytes from the first memory byte in a virtual page to the addressed memory byte. Just as the number of bits in the virtual region number may vary, the number of bits in the virtual page number and the number of bits in the virtual offset may vary depending on the particular virtual translation scheme utilized.

4.3 Virtual address translation

In order to reference physical memory a virtual address must be translated into a physical address. A virtual address translation scheme for one embodiment of the invention is shown in FIG. 2.

4.3.1 Determining the virtual region starting address

In one embodiment, one of the eight virtual regions may be selected by the virtual region number of a virtual address. For example, the virtual region number may be used to reference one of the virtual region registers. The starting address stored in the referenced virtual region register may be used as a search key by the TLB.

4.3.2 Interrogate the TLB

After the virtual region's starting address is determined, the TLB is interrogated with the virtual address's virtual page number and optionally the virtual address's virtual region starting address. This interrogation results in a search of the virtual to physical memory translations that are stored in the TLB that correspond to the virtual address's virtual page number and optionally the virtual address's virtual region starting address. If the search is successful, then the physical page number that corresponds to the virtual page number is concatenated with the virtual offset to form a physical address. Matching virtual to physical memory translations may optionally be qualified by privilege level access right checks and by protection domain checks as are known by those skilled in the art.

If a matching virtual to physical memory translation is not found, then the microprocessor may generate a TLB miss fault. The microprocessor may then request the operating system to supply the requested virtual to physical memory translation. Alternatively, instead of generating a TLB miss fault, the microprocessor may search the page table directly.

4.4 Translation lookaside buffer

Figure 3:
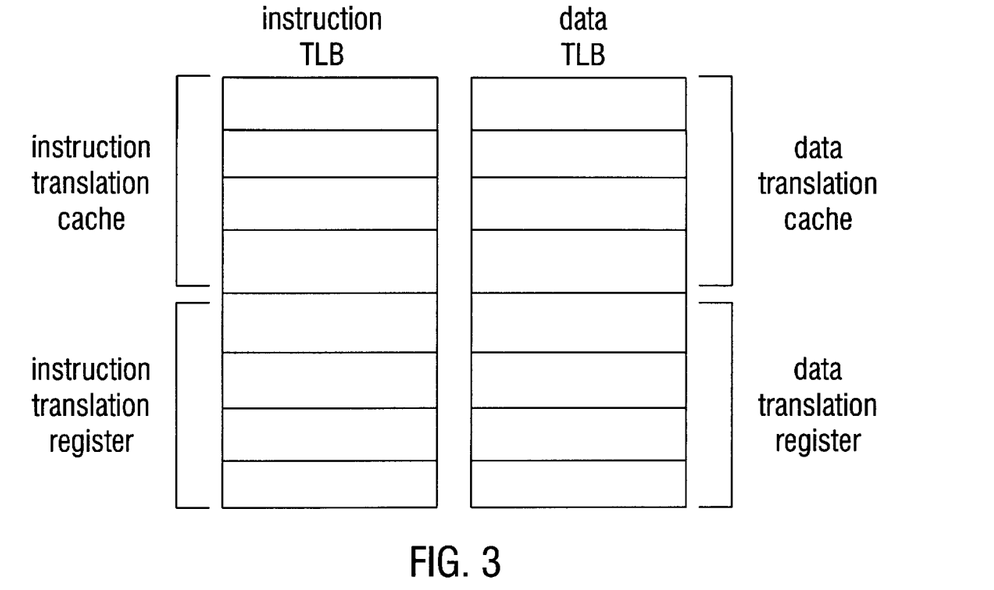
FIG. 3 presents a TLB of one embodiment of the invention.

In one embodiment of the present invention, the microprocessor maintains two TLBs as shown in FIG. 3. The first TLB is an instruction TLB and the second TLB is a data TLB. The instruction TLB services translation requests for instruction references. The data TLB services translation requests for data memory references. Hereinafter, the term TLB will be used to refer to the combined instruction and data TLB structure.

The TLB is typically an associative memory that stores virtual to physical memory translations. As discussed above, a virtual to physical memory translation consists of a virtual page number and a physical page number. While one specific embodiment of the invention includes a virtual region number within a virtual page number, in other embodiments, a virtual page number will not be included in the virtual region number. Optionally, a virtual region number, privilege information, protection information, data present information, and other information may also be stored by the TLB.

The TLB may be further divided into two subsections: a translation register and a translation cache. Each subsection of the TLB contains storage locations. The only difference between the two subsections is the method used to insert and delete virtual to physical memory translations to and from the storage locations. Thus, a single interrogation mechanism may be used for both the translation register and the translation cache.

4.4.1 Translation Register

The translation register portion of the TLB stores certain virtual to physical memory translations. These virtual to physical memory translations are inserted and deleted only by computer programs running on the microprocessor. Thus, the translation register contains software-managed storage locations. The number of storage locations within the translation register may be implementation specific. However, in one embodiment of the present invention, the TLB will store up to 64 software-managed virtual to physical memory translations.

When a virtual to physical memory translation is inserted into storage locations within the translation register, a lock bit that corresponds to the translation is typically set. This lock bit indicates that the virtual to physical memory translation is stored in translation register storage locations. By setting this bit, the corresponding virtual to physical memory translation is "locked-down" in the TLB. For example, the virtual to physical memory translations that correspond to physical pages containing kernel memory areas, framebuffers, page tables, and sensitive interrupt code may be "locked-down." Other virtual to physical memory translations may also be "locked-down" for performance reasons. After a virtual to physical memory translation is "locked-down" it will not be deleted or replaced unless a computer program issues an appropriate "special computer program instruction."

4.4.1.1 Insert/Purge translation register instructions

In one embodiment of the invention, virtual to physical memory translations may be inserted into a specific translation register with an insert translation register instruction. The insert translation register instruction may indicate one or more storage locations in the translation register where the virtual to physical memory translation is to be stored. Thus, the insert translation register instruction inserts a specified translation into a specified storage location.

Virtual to physical memory translations may be deleted by a computer program issuing a purge translation register instruction or by inserting a new virtual to physical memory translation over an existing translation with an insert translation register instruction.

When a virtual to physical memory translation is deleted, all of the corresponding storage locations do not need to be reset. In one embodiment, the virtual to physical memory translation may have a corresponding bit, that will be referred to as a valid bit. When a translation is to be deleted, the valid bit may be set to a value that indicates that the translation is invalid. If such a bit is used, then it may be set to a value that indicates that the translation is valid when a new virtual to physical memory translation is inserted.

4.4.2 Translation cache

The translation cache portion of the TLB also stores certain virtual to physical memory translations. These virtual to physical memory translations may be inserted and deleted by the microprocessor and by computer programs. Thus, the translation cache is both hardware-managed and software-managed. Although the size of the translation cache may vary, in one embodiment, the translation cache will store at least 64 virtual to physical memory translations.

4.4.2.1 Hardware management of the translation cache

In one embodiment of the invention, the microprocessor may insert, delete and/or replace any virtual to physical memory translation stored in the translation cache. Thus, implementation-specific algorithms may be utilized by the microprocessor to optimize the allocation of the translation cache. Common implementation-specific algorithms include the least-recently-used algorithm, the most-recently-used algorithm, the first-in-first-out algorithm, and the random algorithm. These algorithms are known by those skilled in the art.

4.4.2.2 Insert/Purge translation cache instructions

The translation cache is also managed by software. For example, virtual to physical memory translations may be inserted into the translation cache with computer program-issued insert translation cache instructions. When an insert translation cache instruction inserts a virtual to physical memory translation into the translation cache, it does not set the lock bit corresponding to that translation.

Virtual to physical memory translations may also be deleted from the translation cache when software issues purge translation cache instructions. Translation cache purges may not modify virtual to physical memory translations that are stored in translation registers.

Even though software may insert virtual to physical memory translations into the translation cache, software may not assume that such translations will always be present in the translation cache. Because the microprocessor may also insert virtual to physical memory translations into the translation cache, the microprocessor may replace software-inserted virtual to physical memory translations.

4.5 Alternative embodiments

Figure 4:
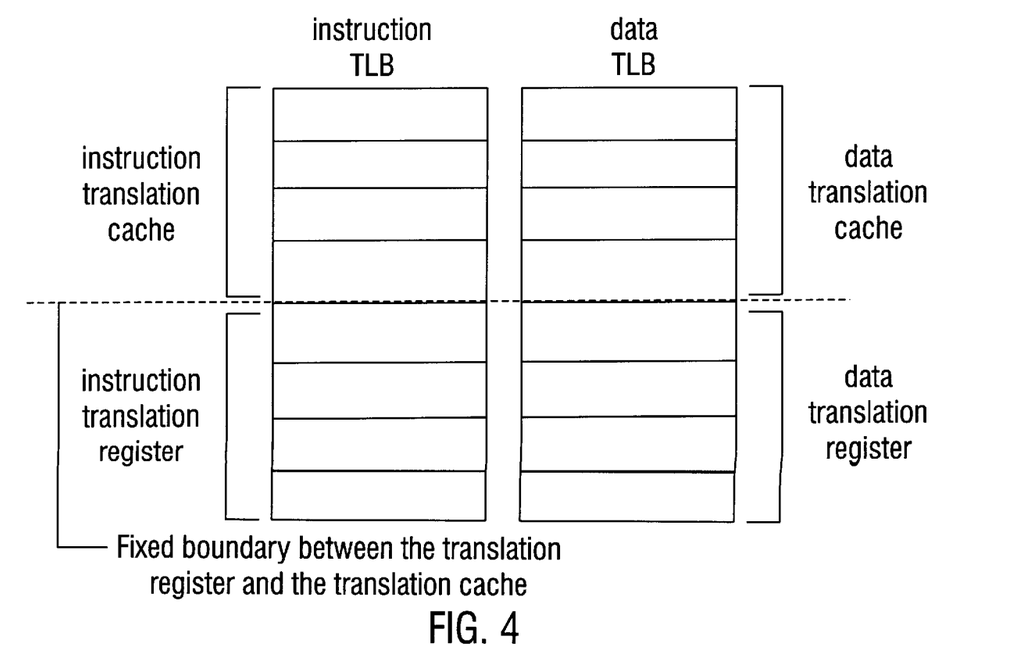
FIG. 4 presents a TLB with a fixed boundary between the translation register and the translation cache.

4.5.1 Fixed boundary between the translation register and the translation cache In one embodiment, the boundary between the translation register and the translation cache may be fixed. A TLB with such a fixed boundary is shown in FIG. 4. This embodiment may not optimally utilize all storage locations. However, this embodiment's simple implementation may be optimal in some circumstances.

Figure 5:
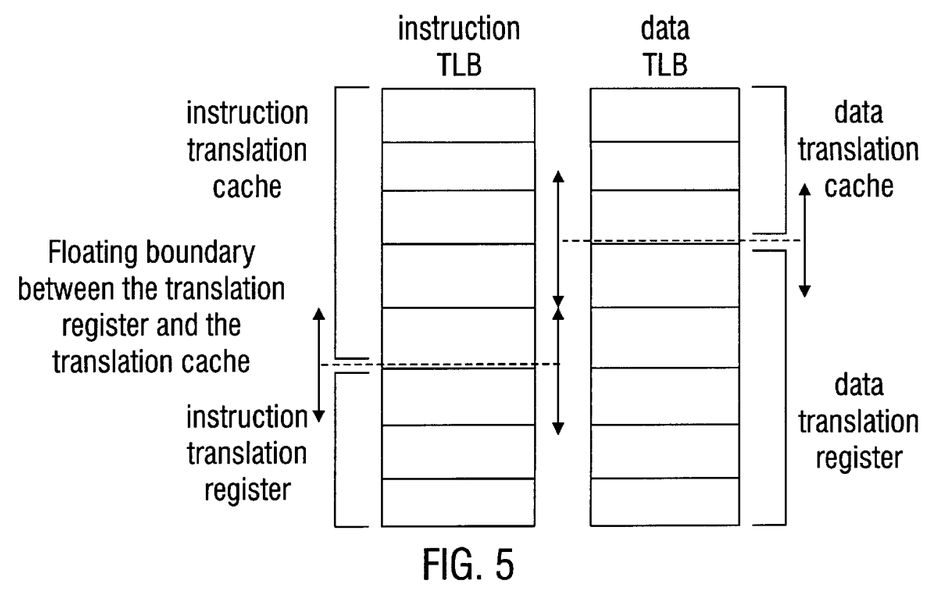
FIG. 5 presents a TLB with a floating boundary between the translation register and the translation cache.

4.5.2 Floating boundary between the translation register and the translation cache In another embodiment, the boundary between the translation register and the translation cache may float. A TLB with a floating boundary is shown in FIG. 5. In this embodiment, any virtual to physical translation stored above the boundary is considered to be stored in the translation cache, and any translation stored below the boundary is considered to be stored in the translation register.

In this embodiment, virtual to physical memory translations may be stored in the translation register in a first-in-first-out order. Use of such a storage scheme creates a variable size stack-like structure in the translation register. The "top" of the stack-like structure may be indicated by the use of a pointer. This pointer will be referred to as the top of the translation register pointer. The top of the translation register pointer may be placed just above the highest numbered translation register storage location. Thus, the top of the translation register pointer will be increased when additional translation register storage locations are utilized and will be decreased when such storage locations are deleted.

By having a floating boundary between the translation register and the translation cache, the use of the storage locations can be maximized. Thus, if a computer program does not utilize most of the software-managed storage locations, then the software-managed storage locations may be allocated or reallocated as hardware-managed storage locations. Similarly, if a computer program needs additional software-managed storage locations, then hardware-managed storage locations may be allocated or reallocated as software-managed storage locations.

4.5.3 TLB with intermingled storage locations

Figure 6:
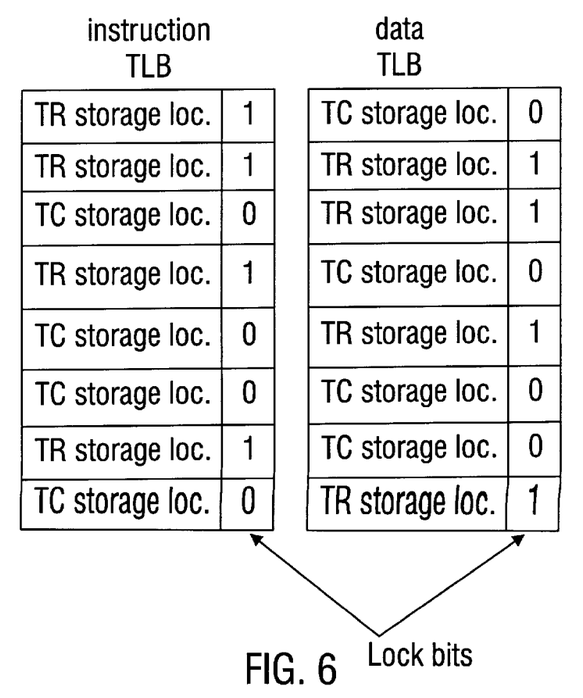
FIG. 6 presents a TLB with a translation register storage locations intermingled with translation cache storage locations.

FIG. 6 presents a TLB with translation register storage locations intermingled with translation cache storage locations. In this embodiment a lock bit may be used to indicate whether a particular storage location is a translation register storage location or a translation cache storage location. For example, if a the lock bit of a particular storage location contains a "1," then the storage location would be a translation register storage location. Otherwise, the storage location would be a translation cache storage location.

4.5.4 TLB Sizes

The TLB of the one embodiment can store 128 virtual to physical memory translations. Up to, but not more than, 64 of those translations may be stored in the translation register. The remainder of the TLB would be utilized as a translation cache.

4.5.5 Two-level Caching

In one embodiment of the present invention, the microprocessor includes two levels of address translation caching. A level 1 TLB may store up to 128 virtual to physical memory translations. A level 0 TLB may store up to 16 virtual to physical memory translations that are also stored in the level 1 TLB. When a virtual to physical memory translation that is stored in the level 1 TLB is invalidated, the corresponding translation in the level 0 TLB, if it exists there, is also invalidated.

As stated earlier, one embodiment of the present invention includes an instruction TLB and a data TLB. In this embodiment, separate level 0 and level 1 TLBs may be utilized for data and instructions.

5. REMARKS

A primary advantage of the disclosed TLB is that it provides the advantages of both a software-managed TLB and a hardware-managed TLB. For example, the TLB may provide hardware assist to automatically fill the TLB with a requested physical page number when a TLB miss occurs. This hardware assist may occur concurrently with other microprocessor functions. In addition, the TLB may ensure that the most recently used physical pages are stored in the TLB. In addition, the TLB may be controlled by an computer program running on a microprocessor. This computer program may store certain virtual to physical memory translations that correspond to operating system kernels, framebuffers, or input-output in the TLB regardless of physical page use patterns. Further, the disclosed TLB does not have any of the disadvantages discussed with separate hardware-managed or software-managed TLBs.

Another advantage is that the disclosed TLB optimizes the use of silicon area. By having a floating boundary between the translation register and the translation cache or intermingled storage locations, the use of the storage locations can be maximized. Thus, if a computer program does not utilize most of the software-managed storage locations, then the software-managed storage locations may become hardware-managed storage locations.

Another advantage is that a single interrogation scheme may be utilized for both the translation register and the translation cache. Thus, the TLB structure of the present invention avoids delays present in some conventional TLBs such as parallel look up and muxing of TLB outputs. As a result, the TLB may return a requested virtual to physical memory translation in a sufficiently short time so that the two memory accesses required to fetch a single entry from memory may occur in a single microprocessor clock cycle.

It will be appreciated by those of ordinary skill having the benefit of this disclosure that the illustrative embodiments described above are capable of numerous variations without departing from the scope and spirit of the invention. Accordingly, the exclusive rights sought to be patented are as described in the claims below.

What is claimed is:

1. A method of storing a plurality of virtual to physical memory translations into first and second storage locations in a translation lookaside buffer, the method comprising:
   (a) inserting at least a portion of a first virtual to physical memory translation of the plurality of virtual to physical memory translations into the first storage location in the translation lookaside buffer, the at least a portion of the first virtual to physical memory translation being inserted by a computer program;
   (b) inserting at least a portion of a second virtual to physical memory translation of the plurality of virtual to physical memory translations into the first storage location in the translation lookaside buffer, the at least a portion of the second virtual to physical memory translation being inserted by a microprocessor capable of replacing the at least a portion of the first virtual to physical memory translation; and
   (c) inserting at least a portion of a third virtual to physical memory translation of the plurality of virtual to physical memory translations into a second storage location in the translation lookaside buffer, the at least a portion of the third virtual to physical memory translation being inserted only by the computer program setting a first lock bit locking down the at least a portion of the third virtual to physical memory translation.

2. The method of claim 1 wherein inserting at least a portion of a first virtual to physical memory translation into the first storage location in the translation lookaside buffer includes inserting the at least a portion of the first virtual to physical memory translation into a register in the microprocessor.

3. The method of claim 1 wherein inserting at least a portion of a first virtual to physical memory translation into the first storage location in the translation lookaside buffer includes inserting the at least a portion of the first virtual to physical memory translation into one of a plurality of storage locations within the translation lookaside buffer.

4. The method of claim 1 wherein the at least a portion of the first virtual to physical memory translation is inserted into the first storage location in the translation lookaside buffer by a computer operating system.

5. The method of claim 1 wherein inserting at least a portion of a first virtual to physical memory translation into the first storage location in the translation lookaside buffer includes inserting a virtual region number having a first number of bits less than a second number of bits of a virtual address corresponding to the first virtual to physical memory translation into the first storage location in the translation lookaside buffer.

6. The method of claim 1, including:
   (d) inserting at least a portion of a fourth virtual to physical memory translation of the plurality of virtual to physical memory translations into the second storage location in the translation lookaside buffer, the at least a portion of the fourth virtual to physical memory translation being inserted by the computer program issuing a special computer instruction resetting the first lock bit so that the at least a portion of the third virtual to physical memory translation is replaced by the at least a portion of the fourth virtual to physical memory translation;
   (e) inserting at least a portion of a fifth virtual to physical memory translation of the plurality of virtual to physical memory translations into the second storage location in the translation lookaside buffer, the at least a portion of the fifth virtual to physical memory translation being inserted by the microprocessor capable of replacing the at least a portion of the fourth virtual to physical memory translation; and
   (f) inserting at least a portion of a sixth virtual to physical memory translation of the plurality of virtual to physical memory translations into the first storage location in the translation lookaside buffer, the at least a portion of the sixth virtual to physical memory translation being inserted only by the computer program setting a second lock bit locking down the at least a portion of the sixth virtual to physical memory translation.

7. A translation lookaside buffer comprising a first storage location in the translation lookaside buffer to store at least a portion of a first virtual to physical memory translation, the first storage location in the translation lookaside buffer being both hardware-managed and software-managed, and a second storage location in the translation lookaside buffer to store at least a portion of a second virtual to physical memory translation, the second storage location in the translation lookaside buffer being only software-managed.

8. The translation lookaside buffer of claim 7, wherein the first and second storage locations in the translation lookaside buffer are reallocatable, with the first storage location in the translation lookaside buffer capable of being only software-managed and the second storage location in the translation lookaside buffer capable of being both hardware-managed and software-managed.

9. A translation lookaside buffer comprising a first storage location in the translation lookaside buffer to store at least a portion of a first virtual to physical memory translation, the first storage location in the translation lookaside buffer being managed by both a microprocessor and by a computer program, and a second storage location in the translation lookaside buffer to store at least a portion of a second virtual to physical memory translation, the second storage location in the translation lookaside buffer being managed by only the computer program.

10. The translation lookaside buffer of claim 9 wherein the computer program includes a computer operating system.

11. The translation lookaside buffer of claim 9, wherein the first and second storage locations in the translation lookaside buffer are reallocatable, with the first storage location in the translation lookaside buffer capable of being managed by only the computer program and the second storage location in the translation lookaside buffer capable of being managed by both the microprocessor and the computer program.

12. A translation lookaside buffer for storing a plurality of physical page numbers, the translation lookaside buffer comprising at least a first storage location in the translation lookaside buffer to store a first physical page number of the plurality of physical page numbers, the at least the first storage location in the translation lookaside buffer being both hardware-managed and software-managed, and at least a second storage location in the translation lookaside buffer to store a second physical page number of the plurality of physical page numbers, the at least the second storage location in the translation lookaside buffer being only software-managed.

13. The translation lookaside buffer of claim 12, wherein the at least the first and the at least the second storage locations in the translation lookaside buffer are reallocatable, with the at least the first storage location in the translation lookaside buffer capable of being only software-managed and the at least the second storage location in the translation lookaside buffer capable of being both hardware-managed and software-managed.

14. A translation lookaside buffer for storing a first and second plurality of physical page numbers, the translation lookaside buffer comprising:

(a) a first plurality of storage locations in the translation lookaside buffer to store the first plurality of physical page numbers, the first plurality of storage locations in the translation lookaside buffer being both hardware-managed and software-managed; and (b) a second plurality of storage locations in the translation lookaside buffer to store the second plurality of physical page numbers, the second plurality of storage locations in the translation lookaside buffer being only software-managed.

15. The translation lookaside buffer of claim 14 wherein a fixed boundary exists between the first plurality of storage locations in the translation lookaside buffer and the second plurality of storage locations in the translation lookaside buffer.

16. The translation lookaside buffer of claim 14 wherein a floating boundary exists between the first plurality of storage locations in the translation lookaside buffer and the second plurality of storage locations in the translation lookaside buffer.

17. The translation lookaside buffer of claim 14 wherein the first plurality of storage locations in the translation lookaside buffer and the second plurality of storage locations in the translation lookaside buffer are intermingled.

18. A method of allocating a plurality of storage locations in a translation lookaside buffer, the method comprising:

(a) allocating at least a first storage location in the translation lookaside buffer to be both hardware-managed and software-managed; and (b) allocating at least a second storage location in the translation lookaside buffer to be only software-managed.

19. The method of claim 18 further including:

(c) reallocating the first storage location in the translation lookaside buffer, previously allocated to be both hardware-managed and software-managed, to be only software-managed.

20. The method of claim 18 further including:

(c) reallocating the second storage location in the translation lookaside buffer, previously allocated to be only software-managed, to be both hardware-managed and software-managed.

* * * * *